United States Patent
Lee et al.

(10) Patent No.: US 12,421,428 B2
(45) Date of Patent: Sep. 23, 2025

(54) AQUEOUS ACRYLIC PRESSURE-SENSITIVE ADHESIVE COMPOSITION, METHOD OF PREPARING THE SAME AND PRESSURE-SENSITIVE ADHESIVE SHEET INCLUDING THE SAME

(71) Applicant: LG Chem, Ltd., Seoul (KR)

(72) Inventors: Kum Hyoung Lee, Daejeon (KR); Seung Hun Yang, Daejeon (KR); Yoon Jung Kim, Daejeon (KR)

(73) Assignee: LG Chem, Ltd., Seoul (KR)

(*) Notice: Subject to any disclaimer, the term of this patent is extended or adjusted under 35 U.S.C. 154(b) by 1053 days.

(21) Appl. No.: 17/426,029

(22) PCT Filed: Dec. 24, 2020

(86) PCT No.: PCT/KR2020/019101
§ 371 (c)(1),
(2) Date: Jul. 28, 2021

(87) PCT Pub. No.: WO2021/137531
PCT Pub. Date: Jul. 8, 2021

(65) Prior Publication Data
US 2022/0154051 A1    May 19, 2022

(30) Foreign Application Priority Data

Jan. 3, 2020 (KR) .......... 10-2020-0000702
Dec. 23, 2020 (KR) .......... 10-2020-0181497

(51) Int. Cl.
C09J 133/08    (2006.01)
C09J 133/10    (2006.01)

(52) U.S. Cl.
CPC ........... *C09J 133/08* (2013.01); *C09J 133/10* (2013.01)

(58) Field of Classification Search
CPC .... C09J 133/08; C09J 133/10; C09J 133/066; C09J 133/064; C09J 7/385; C09J 2423/106; C09J 2433/00; C09J 2301/312; C09J 2301/40; C08K 5/41; C08F 220/1804; C08F 220/1808
See application file for complete search history.

(56) References Cited

U.S. PATENT DOCUMENTS

| | | | |
|---|---|---|---|
| 6,013,722 A | 1/2000 | Yang et al. | |
| 2003/0158331 A1 | 8/2003 | Shoaf et al. | |
| 2005/0215678 A1 | 9/2005 | Ludtke et al. | |
| 2010/0188620 A1 | 7/2010 | Kim et al. | |
| 2014/0234562 A1 | 8/2014 | Traser et al. | |
| 2016/0122600 A1 | 5/2016 | Moon et al. | |
| 2018/0037784 A1* | 2/2018 | Lugli | C09J 7/383 |
| 2019/0085221 A1* | 3/2019 | Van Holen | C08F 220/1808 |
| 2024/0033880 A1 | 2/2024 | Miller et al. | |

FOREIGN PATENT DOCUMENTS

| | | |
|---|---|---|
| CN | 101671532 A | 3/2010 |
| CN | 111684035 A | 9/2020 |
| JP | 2000109784 A | 4/2000 |
| JP | 2002309209 A | 10/2002 |
| JP | 2006056936 A | 3/2006 |
| JP | 4595439 B2 | 12/2010 |
| KR | 20080094282 A | 10/2008 |
| KR | 20130031516 A | 3/2013 |
| KR | 20140082714 A | 7/2014 |
| KR | 20160053779 A | 5/2016 |
| KR | 101675452 B1 | 11/2016 |
| KR | 20170088492 A | 8/2017 |
| KR | 20180075307 A | 7/2018 |

OTHER PUBLICATIONS

International Search Report for Application No. PCT/KR2020/019101, mailing Apr. 7, 2021, 2 pages.
Pan Soo Kim et al, "Effect of Monomer on Crosslinking Properties of Acrylic Pressure-Sensitive Adhesives", Journal of Adhesion and Interface, published Jun. 2016, pp. 56-61, vol. 17, No. 2, Korea Institute of Science and Technology Information, Korea (English abstract provided).
Search Report dated Aug. 24, 2022 from Office Action for Application No. 202080010749.8 issued Aug. 31, 2022. 2 pgs.
Search Report for European Application No. 20909248.5 dated Jan. 31, 2022. 2 pgs.

* cited by examiner

*Primary Examiner* — Scott R. Walshon
(74) *Attorney, Agent, or Firm* — Lerner David LLP

(57) ABSTRACT

An aqueous acrylic pressure-sensitive adhesive composition, a method of preparing the same and a pressure-sensitive adhesive sheet including the same are disclosed herein. In some embodiments, an aqueous acrylic pressure-sensitive adhesive composition includes a copolymer including 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid, and an anionic surfactant, wherein the anionic surfactant is present in an amount of 0.01 to 5 parts by weight based on 100 parts by weight of the copolymer, and wherein the copolymer has an average particle diameter of 500 nm or less and satisfies Equation 1.

8 Claims, No Drawings

AQUEOUS ACRYLIC PRESSURE-SENSITIVE ADHESIVE COMPOSITION, METHOD OF PREPARING THE SAME AND PRESSURE-SENSITIVE ADHESIVE SHEET INCLUDING THE SAME

CROSS-REFERENCE TO RELATED APPLICATIONS

The present application is a national phase entry under 35 U.S.C. § 371 of International Application No. PCT/KR2020/019101, filed on Dec. 24, 2020, which claims priority to Korean Patent Application No. 10-2020-0000702, filed on Jan. 3, 2020, and Korean Patent Application No. 10-2020-0181497, filed on Dec. 23, 2020, the disclosures of which are incorporated by reference herein.

TECHNICAL FIELD

The present invention relates to an aqueous acrylic pressure-sensitive adhesive composition, a method of preparing the same and a pressure-sensitive adhesive sheet including the same, and more particularly to an aqueous acrylic pressure-sensitive adhesive composition prepared by adjusting ball tack and loop tack to predetermined values using a new relational formula while limiting hydrophilicity within a predetermined range, thus exhibiting greatly improved pressure-sensitive adhesion and holding power, a method of preparing the aqueous acrylic pressure-sensitive adhesive composition, and a pressure-sensitive adhesive sheet including the aqueous acrylic pressure-sensitive adhesive composition.

BACKGROUND ART

A pressure-sensitive adhesive is a material that can adhere to an adherend even under slight pressure. Unlike an adhesive, the pressure-sensitive adhesive has the properties of a semi-solid that is an intermediate between a solid and a liquid initially, and maintains the same semi-solid property as the initial state even after curing, thereby being used in various fields such as printing, chemistry, pharmaceuticals, home appliances, automobiles, stationery, etc.

The pressure-sensitive adhesive may be classified into an aqueous adhesive and an oil-based adhesive depending on melting properties thereof, and may be classified into acrylic, rubber-based, silicone-based, and EVA-based adhesives depending upon monomers used for preparation thereof. In addition, the pressure-sensitive adhesive may be classified into a solvent type, an emulsion type, and a hot melt type according to the shape thereof. Further, the pressure-sensitive adhesive properties of the pressure-sensitive adhesive are generally classified into three properties: pressure-sensitive adhesion (peel strength), initial tack, and holding power. Thereamong, tack is evaluated as force required to separate a pressure-sensitive adhesive from an adherend after brief contact therebetween. As methods of evaluating tack, there are ball tack, loop tack, etc. However, high ball tack does not necessarily mean high loop tack. For example, a method of increasing the content of butyl acrylate was attempted to implement an excellent ball tack, but in this case, loop tack is decreased.

Until now, many aqueous acrylic pressure-sensitive adhesive compositions have been developed, but have high fluctuations between the composition and physical properties thereof and difficulty in prediction of physical properties. Accordingly, exiting aqueous pressure-sensitive adhesives do not meet pressure-sensitive adhesion and holding power required in the market. Therefore, there is a need for development of a pressure-sensitive adhesive having greatly improved pressure-sensitive adhesion and holding power.

RELATED ART DOCUMENT

Patent Document

KR 2017-0088492 A

DISCLOSURE

Technical Problem

Therefore, the present invention has been made in view of the above problems, and it is one object of the present invention to provide an aqueous acrylic pressure-sensitive adhesive composition, a method of preparing the same and a pressure-sensitive adhesive sheet including the same, and more particularly to an aqueous acrylic pressure-sensitive adhesive composition prepared by adjusting ball tack and loop tack to predetermined values or more while limiting hydrophilicity within a predetermined range, thus exhibiting greatly improved pressure-sensitive adhesion and holding power, a method of preparing the aqueous acrylic pressure-sensitive adhesive composition, and a pressure-sensitive adhesive sheet including the aqueous acrylic pressure-sensitive adhesive composition.

The above and other objects can be accomplished by the present invention described below.

Technical Solution

In accordance with an aspect of the present invention, the above and other objects can be accomplished by the provision of an aqueous acrylic pressure-sensitive adhesive composition, including: a copolymer including 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid, and an anionic surfactant, wherein the anionic surfactant is present in an amount of 0.01 to 5 parts by weight based on 100 parts by weight of the copolymer, and wherein the copolymer has an average particle diameter of 500 nm or less and satisfies Equation 1 below:

$$0.55 \leq X/Y < 1.07 \qquad \text{[Equation 1]}$$

wherein X denotes a loop tack value (N/25 mm), and Y denotes ball tack strength (#).

In accordance with another aspect of the present invention, there is provided an aqueous acrylic pressure-sensitive adhesive composition, including: a copolymer including 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid, and an anionic surfactant, wherein the anionic surfactant is present in an amount of 0.01 to 5 parts by weight based on 100 parts by weight of the copolymer, and wherein the copolymer has an average particle diameter of 500 nm or less and satisfies Equation 1a below:

$$47 < X/Ya < 200 \qquad \text{[Equation 1a]}$$

wherein X denotes a loop tack value (N/25 mm), and Ya denotes a value obtained by converting the strength of ball tack into a unit of force (N).

In accordance with another aspect of the present invention, there is provided an aqueous acrylic pressure-sensitive adhesive composition, including: a copolymer including 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid, and an anionic surfactant, wherein the anionic surfactant is present in an amount of 0.01 to 5 parts by weight based on 100 parts by weight of the copolymer, and wherein the copolymer has an average particle diameter of 500 nm or less, and the aqueous acrylic pressure-sensitive adhesive composition has a loop tack of 12 N/25 mm or more and a ball tack strength of 20 or more that is measured according to the inclined ball tack test method (inclination angle: 30 degrees, 23° C., 55% RH).

In the present disclosure, RH refers to relative humidity, and a relative humidity may be defined as a ratio (%) of an actual water vapor pressure to a saturated water vapor pressure. A method of measuring the water vapor pressure is not particularly limited so long as it is a method commonly used in the technical field to which the present invention belongs.

In accordance with still another aspect of the present invention, there is provided an aqueous acrylic pressure-sensitive adhesive composition, including: a copolymer including 85 to 99% by weight of a linear alkyl acrylate, 0.1 to 3% by weight of an acrylate monomer including a hydroxy group and 0.1 to 3% by weight of an unsaturated carboxylic acid, and an anionic surfactant, wherein the anionic surfactant is present in an amount of 0.3 to 5 parts by weight based on 100 parts by weight of the copolymer, and wherein the copolymer has an average particle diameter of 500 nm or less.

In accordance with still another aspect of the present invention, there is provided a method of preparing the aqueous acrylic pressure-sensitive adhesive composition, the method including: mixing a copolymer and an anionic surfactant and water to prepare an emulsion, wherein the copolymer includes 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid, and wherein the anionic surfactant is present in an amount of 0.01 to 5 parts by weight based on 100 parts by weight of the copolymer; and adding a water-soluble initiator to the emulsion, wherein the water-soluble initiator is present in an amount of 0.01 to 1 part by weight based on 100 parts by weight of the copolymer, and then polymerizing the emulsion including the water-soluble initiator at 80 to 90° C. for 2 to 10 hours, wherein the copolymer has an average particle diameter of 500 nm or less and satisfies Equation 1 below.

In accordance with still another aspect of the present invention, there is provided a method of preparing the aqueous acrylic pressure-sensitive adhesive composition, the method including: mixing a copolymer, an anionic surfactant, and water to prepare an emulsion, wherein the copolymer including 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid, and wherein the anionic surfactant is present in an amount of 0.01 to 5 parts by weight of the anionic surfactant based on 100 parts by weight of the copolymer; and adding a water-soluble initiator to the emulsion, wherein the water-soluble initiator is present in an amount of 0.01 to 1 part by weight based on 100 parts by weight of the copolymer, and then polymerizing the emulsion including the water-soluble based initiator at 80 to 90° C. for 2 to 10 hours, wherein the copolymer has an average particle diameter of 500 nm or less and satisfies Equation 1a below.

In accordance with still another aspect of the present invention, there is provided a method of preparing the aqueous acrylic pressure-sensitive adhesive composition, the method including: mixing a copolymer, an anionic surfactant, and water to prepare an emulsion, wherein the copolymer including 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid, and wherein the anionic surfactant is present in an amount of 0.01 to 5 parts by weight based on 100 parts by weight of the copolymer; and adding a water-soluble initiator to the emulsion, wherein the water-soluble initiator is present in an amount of 0.01 to 1 part by weight based on 100 parts by weight of the copolymer, and then polymerizing the emulsion including the water-soluble initiator at 80 to 90° C. for 2 to 10 hours, wherein the copolymer has an average particle diameter of 500 nm or less, and the aqueous acrylic pressure-sensitive adhesive composition has a loop tack of 12 N/25 mm or more and a ball tack strength of 20 or more that is measured according to the inclined ball tack test method (inclined angle: 30 degrees, 23° C., 55% RH).

In accordance with still another aspect of the present invention, there is provided a method of preparing the aqueous acrylic pressure-sensitive adhesive composition, the method including: mixing a copolymer, an anionic surfactant, and water to prepare an emulsion, wherein the copolymer including 85 to 99% by weight of a linear alkyl acrylate, 0.1 to 3% by weight of an acrylate monomer including a hydroxy group and 0.1 to 3% by weight of an unsaturated carboxylic acid, and wherein the anionic surfactant is present in an amount of 0.3 to 5 parts by weight based on 100 parts by weight of the copolymer; and adding a water-soluble initiator to the emulsion, wherein the water-soluble initiator is present in an amount of 0.01 to 1 part by weight based on 100 parts by weight of the copolymer, and then polymerizing the emulsion including the water-soluble initiator at 80 to 90° C. for 2 to 10 hours, wherein the copolymer has an average particle diameter of 500 nm or less.

In accordance with yet another aspect of the present invention, there is provided a pressure-sensitive adhesive sheet formed of the aqueous acrylic pressure-sensitive adhesive composition of the present disclosure.

Advantageous Effects

The present invention provides an aqueous acrylic pressure-sensitive adhesive composition, a method of preparing the same and a pressure-sensitive adhesive sheet including the same, and more particularly to an aqueous acrylic pressure-sensitive adhesive composition prepared by adjusting ball tack and loop tack to predetermined values or more while limiting hydrophilicity within a predetermined range, thus exhibiting greatly improved pressure-sensitive adhesion and holding power, a method of preparing the aqueous acrylic pressure-sensitive adhesive composition, and a pressure-sensitive adhesive sheet including the aqueous acrylic pressure-sensitive adhesive composition.

BEST MODE

Hereinafter, an aqueous acrylic pressure-sensitive adhesive composition, a method of preparing the same and a pressure-sensitive adhesive sheet including the same according to the present disclosure are described in detail.

The present inventors have confirmed that an aqueous acrylic pressure-sensitive adhesive composition prepared by adjusting ball tack and loop tack to predetermined values using a new relational formula while limiting hydrophilicity within a predetermined range exhibits greatly improved pressure-sensitive adhesion and holding power. Based on this, the present inventors have conducted further research, thus completing the present invention.

An aqueous acrylic pressure-sensitive adhesive composition of the present invention includes a copolymer including 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid; and an anionic surfactant, wherein the anionic surfactant is present in an amount of 0.01 to 1 part by weight based on 100 parts by weight of the copolymer, wherein the copolymer has an average particle diameter of 500 nm or less and satisfies Equation 1 below. In this case, there is an advantage in that ball tack and loop tack may be simultaneously adjusted to predetermined values or more, and thus, pressure-sensitive adhesion and holding power may be greatly improved.

$$0.55 \leq X/Y < 1.07 \quad \text{[Equation 1]}$$

wherein X denotes a loop tack value (N/25 mm), and Y denotes ball tack strength (#).

In addition, in another embodiment, the aqueous acrylic pressure-sensitive adhesive composition of the present invention may include a copolymer including 85 to 99% by weight of a linear alkyl acrylate, 0.1 to 3% by weight of an acrylate monomer including a hydroxy group and 0.1 to 3% by weight of an unsaturated carboxylic acid; and an anionic surfactant, wherein the anionic surfactant is present in an amount of 0.3 to 5 part by weight based on 100 parts by weight of the copolymer, wherein the copolymer has an average particle diameter of 500 nm or less.

In the present disclosure, a loop tack value refers to a force degree of a pressure-sensitive adhesive allowing an adherend to adhere to the pressure-sensitive adhesive when pressure is applied to the adherend. Initial pressure-sensitive adhesion is superior with increasing loop tack value.

In the present disclosure, the strength of ball tack means the number of a steel ball. In particular, when a steel ball that has rolled 100 mm in length along a slope of 30° passes through an exposed adhesive surface and stops between 30 mm and 70 mm from the beginning of the adhesive surface, the number of the steel ball is the strength of ball tack. The number of the steel ball is defined from No. 1 up to No. 32. Here, a steel ball having a diameter of 1/32 inch is defined as No. 1. Initial pressure-sensitive adhesion is superior with increasing number.

In the present disclosure, initial pressure-sensitive adhesion refers to a force that separates an adherend from a pressure-sensitive adhesive within a short time, i.e., that is, instantaneous adhesiveness.

In the present disclosure, pressure-sensitive adhesion refers to the bonding force between a pressure-sensitive adhesive and an adherend surface, and can be measured through a 180 degree peel test unless otherwise defined.

In the present disclosure, holding power refers to the internal cohesive force of a pressure-sensitive adhesive itself, and unless otherwise defined, may be confirmed by a method of attaching stainless steel (SUS) to an area of 25 mm×25 mm, and then applying a load with a weight of 1 kg thereto to measure a falling time of the weight.

The alkyl (meth)acrylate monomer of the present disclosure may be, for example, one or more selected from the group consisting of a linear alkyl (meth)acrylate and a branched alkyl (meth)acrylate. In this case, the pressure-sensitive adhesive can be attached to an adherend in a short time and can exhibit excellent pressure-sensitive adhesion.

In the present disclosure, an alkyl (meth)acrylate monomer is defined as including both an alkyl acrylate monomer and an alkyl methacrylate monomer.

As a particular example, the alkyl (meth)acrylate monomer may be one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth) acrylate, 2-ethylbutyl (meth) acrylate, n-octyl (meth)acrylate, isooctyl (meth)acrylate, isononyl (meth)acrylate, lauryl (meth)acrylate and tetradecyl (meth)acrylate. In this case, there is an advantage in that the pressure-sensitive adhesive has excellent pressure-sensitive adhesion and can be bonded to an adherend in a short time.

As a preferred example, the alkyl (meth)acrylate monomer may include at least a linear alkyl acrylate. The linear alkyl acrylate is preferably n-butyl acrylate. In this case, there is an advantage in that the pressure-sensitive adhesive has excellent pressure-sensitive adhesion, can be bonded to an adherend in a short time, particularly, has excellent ball tack strength.

For example, the alkyl (meth)acrylate monomer may include 20 to 99% by weight, preferably 40 to 99% by weight, more preferably greater than 90 and 99 or less % by weight, of linear alkyl (meth)acrylate, branched alkyl (meth) acrylate, or a mixture thereof based on 100% by weight of the copolymer. Within these ranges, there is an advantage in that strong force is necessary to separate the pressure-sensitive adhesive from an adherend within a short time.

For example, the alkyl (meth)acrylate monomer may include an amount of 40 to 99% by weight, preferably 91 to % by weight, more preferably 92 to 97% by weight, of linear alkyl acrylate based on 100% by weight of the copolymer. Within these ranges, there is an advantage in that excellent pressure-sensitive adhesion and holding power are provided and, particularly, strong force is necessary to separate the pressure-sensitive adhesive from an adherend within a short time.

As another example, the alkyl (meth)acrylate monomer may include 30 to 60% by weight, preferably 40 to 50% by weight, of branched alkyl acrylate based on 100% by weight of the copolymer. Within these ranges, there is an advantage in that the pressure-sensitive adhesive has excellent cohesion, pressure-sensitive adhesion and momentary pressure-sensitive adhesion.

As still another example, the alkyl (meth)acrylate monomer may include greater than 0 and 10 or less % by weight, preferably 5 to 10% by weight, of alkyl methacrylate, based on 100% by weight of the copolymer. Within these ranges, there is an advantage in that pressure-sensitive adhesion is further improved.

The alkyl methacrylate may be, for example, one or more selected from the group consisting of linear alkyl methacrylate and branched alkyl methacrylate, preferably linear alkyl methacrylate.

The acrylate monomer including a hydroxy group of the present disclosure may be, for example, one or more selected from the group consisting of 2-hydroxyethyl (meth) acrylate, 2-hydroxypropyl (meth) acrylate, 4-hydroxybutyl (meth)acrylate, 6-hydroxyhexyl (meth)acrylate, 8-hydroxyoctyl (meth) acrylate, 2-hydroxyethylene glycol (meth)acrylate and 2-hydroxypropylene glycol (meth)acrylate. In this case, there is an advantage in that pressure-sensitive adhesion to an adherend is improved due to inclusion of the cross-linkable functional group.

The acrylate monomer including a hydroxy group may be included, for example, in an amount of greater than 0 and 3% or less by weight, preferably 0.5 to 3% by weight, more preferably 1 to 2% by weight, based on 100% by weight of the copolymer. Within these ranges, there is an advantage in that excellent pressure-sensitive adhesion is provided due to inclusion of the cross-linkable functional group, strong force is necessary to separate the pressure-sensitive adhesive from an adherend within a short time, and, particularly, loop tack is excellent.

The unsaturated carboxylic acid of the present disclosure, for example, may be one or more selected from the group consisting of acrylic acid, methacrylic acid, crotonic acid, itaconic acid, maleic acid, fumaric acid, citraconic acid and mesaconic acid. In this case, there is an advantage in that both cohesion and pressure-sensitive adhesion are excellent.

The unsaturated carboxylic acid, for example, may be included in an amount of greater than 0 and 3% or less by weight based on 100% by weight of the copolymer. When the unsaturated carboxylic acid is included in an amount of less than the range, cohesion may be decreased, and thus, transfer may occur during peeling. When the unsaturated carboxylic acid is included in an amount of greater than the range, pressure-sensitive adhesion may be decreased.

As a preferred example, the unsaturated carboxylic acid may be included in an amount of 0.5 to 2.5% by weight, more preferably 1 to 2% by weight, based on 100% by weight of the copolymer. Within these ranges, there is an advantage in that pressure-sensitive adhesion is further improved.

The sum of the content of the acrylate monomer including a hydroxy group and the content of the unsaturated carboxylic acid may be 5% by weight or less, preferably 1 to 5% by weight, more preferably 2 to 4% by weight. Within these ranges, there is an advantage in that ball tack and loop tack may be simultaneously adjusted to predetermined values or more, and thus, pressure-sensitive adhesion and holding power may be greatly improved.

The copolymer of the present disclosure may include, for example, 85 to 99% by weight of a linear alkyl acrylate, 0 to 10% by weight of alkyl methacrylate, 0.1 to 3% by weight of an acrylate monomer including a hydroxy group and 0.1 to 3% by weight of an unsaturated carboxylic acid. Within these ranges, there is an advantage in that pressure-sensitive adhesion and holding power are excellent and, particularly, the strength of ball tack is excellent.

As another example, the copolymer may include 20 to 50% by weight of a linear alkyl acrylate, 30 to 60% by weight of branched alkyl acrylate, 5 to 20% by weight of alkyl methacrylate, 0.1 to 3% by weight of an acrylate monomer including a hydroxy group and 0.1 to 3% by weight of an unsaturated carboxylic acid. Within these ranges, there is an advantage in that pressure-sensitive adhesion and holding power are excellent and, particularly, loop tack is excellent.

The anionic surfactant of the present disclosure, for example, may be one or more selected from the group consisting of sodium dodecyl benzene sulfonate, sodium alkyl diphenyl oxide disulfonate, sodium polyoxyethylene alkyl ether sulfate, sodium dialkyl sulfosuccinate, polyethylene oxide alkyl aryl ether, polyethylene oxide alkyl amine and polyethylene oxide alkyl ester. In this case, there is an advantage in that dispersion stability of the of copolymer is improved.

As a preferred example, the anionic surfactant may be one or more selected from the group consisting of sodium dodecyl benzene sulfonate, sodium alkyl diphenyl oxide disulfonate and sodium polyoxyethylene alkyl ether sulfate.

The anionic surfactant may be included, for example, in an amount of 0.01 to 5 parts by weight based on 100 parts by weight of the copolymer. When the anionic surfactant is included in an amount of less than the range, stability after polymerization may be decreased. When the anionic surfactant is included in an amount of greater than the range, a large amount of aggregates may be generated, and the pressure-sensitive adhesive properties may be significantly decreased.

As a preferred example, the anionic surfactant may be included in an amount of 0.1 to 3 parts by weight, more preferably 0.5 to 2 parts by weight, based on 100 parts by weight of the copolymer. Within these ranges, there is an advantage in that polymerization stability and pressure-sensitive adhesive properties are improved.

The anionic surfactant may include, for example, 0.3 to 3 parts by weight, preferably 0.5 to 2 parts by weight, more preferably 0.6 to 1.5 parts by weight, of sodium dodecyl benzene sulfonate, based on 100 parts by weight of the copolymer. Within these ranges, there is an advantage in that stability after polymerization is excellent, pressure-sensitive adhesion is excellent, and initial pressure-sensitive adhesion is excellent due to improved loop tack.

As another example, the anionic surfactant may include 0.1 to 3 parts by weight, preferably 0.3 to 2 parts by weight, more preferably 0.5 to 1.5 parts by weight, of sodium polyoxyethylene alkyl ether sulfate, based on 100 parts by weight of the copolymer. Within these ranges, there is an advantage in that stability after polymerization is excellent, and the pressure-sensitive adhesive properties are improved.

The copolymer of the present disclosure may have an average particle diameter of, for example, 500 nm or less, preferably 50 to 300 nm, more preferably 100 to 280 nm. Within these ranges, there is an advantage in that ball tack and loop tack may be simultaneously adjusted to predetermined values or more, and thus, pressure-sensitive adhesion and holding power can be greatly improved.

In the present disclosure, the average particle diameter may be measured using dynamic light scattering, particularly may be measured as an intensity value in a Gaussian mode using a particle analyzer (Nicomp, CW380). As a particular measurement example, a sample is properly diluted with water so as not to deviate Intensity Setpoint 300 kHz and fed into a glass tube. Measurement may be performed under setting conditions of 23° C., a measurement wavelength of 632.8 nm, and a channel width of 10 μsec.

The aqueous acrylic pressure-sensitive adhesive composition of the present disclosure may further include, for example, a crosslinking agent. In this case, there is an advantage in that cohesion is improved.

The crosslinking agent is added to reinforce cohesion, and may be, for example, a compound including 5 to 15 alkylene oxide repeat units, and having an acrylate group or vinyl group at a terminal thereof. The number of the alkylene oxide repeat units refers to the average number of alkylene oxides included in a used crosslinking agent.

As a particular example, the crosslinking agent may be one or more selected from the group consisting of polyethylene glycol diacrylate, polypropylene glycol diacrylate, 1,6-hexanediol diacrylate, trimethylolpropane triacrylate, ethoxylated trimethylpropane triacrylate, tripropylene glycol diacrylate, 1,3-butanediol diacrylate, pentaerythritol triacrylate, 3-trimethoxysilyl propyl methacrylate, vinyltrimethoxysilane, divinylbenzene and zirconium carbonate.

The aqueous acrylic pressure-sensitive adhesive composition of the present disclosure may include, for example, a water-dispersible tackifier, a wetting agent or a combination thereof.

The water-dispersible tackifier, for example, may be one or more selected from the group consisting of a rosin-based resin and a terpene-based resin. In this case, there is an advantage in that loop tack and peeling force are improved.

The wetting agent may be used to lower surface tension for improvement of coating properties and may be, for example, a dioctyl sodium sulfosuccinate (DOSS)-based compound.

The wetting agent may be used, for example, in an amount of 0 to 2 parts by weight, 0.01 to 1.5 parts by weight, 0.01 to 1 part by weight, or 0.1 to 1.5 parts by weight based on 100 parts by weight of the copolymer. Within these ranges, there is an advantage in that surface tension of latex is decreased, and thus, coating can be easily preformed.

The aqueous acrylic pressure-sensitive adhesive composition of the present disclosure may satisfy, for example, Equation 1 below. In this case, there is an advantage in that pressure-sensitive adhesion and holding power of the aqueous pressure-sensitive adhesive composition are greatly improved.

$$0.55 \leq X/Y < 1.07 \quad \text{[Equation 1]}$$

wherein X denotes a loop tack value (N/25 mm), and Y denotes ball tack strength (#).

Equation 1 may satisfy, for example, $0.55 \leq X/Y < 1.07$, or $0.55 \leq X/Y < 0.95$, preferably $0.55 \leq X/Y < 0.88$. Within these ranges, there is an advantage in that bonding strength between the pressure-sensitive adhesive and an adherend surface is excellent.

As another example, Equation 1 may satisfy $0.67 < X/Y < 0.88$. Within these ranges, there is an advantage in that bonding strength, i.e., pressure-sensitive adhesion, between the pressure-sensitive adhesive and an adherend surface is further improved.

The aqueous acrylic pressure-sensitive adhesive composition may satisfy, for example, Equation 2 below. In this case, there is an advantage in that strong force is necessary to separate the pressure-sensitive adhesive from an adherend within a short time.

$$Y \geq 20 \quad \text{[Equation 2]}$$

In Equation 2, Y may be the same as Y in Equation 1 of the present disclosure described above.

In Equation 2, for example, $Y \geq 20$, preferably $32 \geq Y \geq 20$. Within these ranges, there is an advantage in that momentary pressure-sensitive adhesion, and bonding strength between the pressure-sensitive adhesive and an adherend surface are improved.

The aqueous acrylic pressure-sensitive adhesive composition of the present disclosure may satisfy, for example, Equation 1a below. In this case, there is an advantage in that pressure-sensitive adhesion and holding power of the aqueous pressure-sensitive adhesive composition are greatly improved.

$$47 < X/Ya < 200 \quad \text{[Equation 1a]}$$

wherein X denotes a loop tack value (N/25 mm), and Ya denotes a value obtained by converting the strength of ball tack into a unit of force (N).

In Equation 1a, Y may be, for example, a value obtained by converting the weight according to the number of a steel ball into force.

As a particular example, Ya may be calculated by Equation 3 below.

$$Ya = A \times 0.0098 \quad \text{[Equation 3]}$$

wherein A denotes the weight of a steel ball. Here, the weights of steel balls No. 1 to No 32 are sequentially 0.0021 g, 0.0164 g, 0.0554 g, 0.1313 g, 0.2564 g, 0.4431 g, 0.7036 g, 1.0503 g, 1.4955 g, 2.0514 g, 2.7304 g, 3.5449 g, 4.507 g, 5.6291 g, 6.9236 g, 8.4026 g, 10.0787 g, 11.9639 g, 14.0707 g, 16.4114 g, 18.9982 g, 21.8436 g, 24.9597 g 28.3589 g, 32.0535 g, 36.0558 g, 40.3782 g, 45.0329 g 50.0322 g, 55.3885 g, 61.114 g, and 67.2211 g.

The aqueous acrylic pressure-sensitive adhesive composition may have a glass transition temperature of, for example, −60 to −20° C., preferably −50 to −30° C., more preferably −45 to −35° C. Within these ranges, there is an advantage in that heat resistance is excellent and, when the pressure-sensitive adhesive adhered to a substrate is removed, no residue remains.

In the present disclosure, the glass transition temperature is measured using a DSC device according to ASTM D 3418.

The aqueous acrylic pressure-sensitive adhesive composition of the present disclosure may have a peeling force of, for example, 13 N/25 mm or more, preferably 15 to 20 N/25 mm. Here, the peeling force is measured while peeling at 180 degrees at a rate of 300 mm/min. Within these ranges, pressure-sensitive adhesion is excellent.

The aqueous acrylic pressure-sensitive adhesive composition of the present disclosure may have a holding power of, for example, 10 to 200 hours, 15 to 100 hours, or 20 to 100 hours. Within these ranges, internal cohesion of the pressure-sensitive adhesive itself is excellent.

The aqueous acrylic pressure-sensitive adhesive composition of the present disclosure may have a loop tack of, for example, 12 N/25 mm or more, 13 to 25 N/25 mm, preferably 13.3 to 20 N/25 mm. Within these ranges, there is an advantage in that initial pressure-sensitive adhesion is excellent.

The aqueous acrylic pressure-sensitive adhesive composition of the present disclosure may have ball tack strength (#), for example, 20 or more, or 20 to 32. Within these ranges, there is an advantage in that initial pressure-sensitive adhesion is excellent.

Hereinafter, a method of preparing the aqueous acrylic pressure-sensitive adhesive composition of the present invention is described. All the contents of the aqueous acrylic pressure-sensitive adhesive composition of the present disclosure described above are included in description of the method.

The method of preparing the aqueous acrylic pressure-sensitive adhesive composition of the present disclosure may include, for example, mixing a copolymer, anionic surfactant, and water to prepare an emulsion, wherein the copolymer including 20 to 99% by weight of an alkyl (meth)acrylate monomer, greater than 0 and 3% or less by weight of an acrylate monomer including a hydroxy group and greater than 0 and 3% or less by weight of an unsaturated carboxylic acid, and wherein the anionic surfactant is present in an amount of 0.01 to 5 parts by weight based on 100 parts by weight of the copolymer; and adding water-soluble initiator to the emulsion, wherein the water-soluble initiator is present in an amount of 0.01 to 1 part by weight based on 100 parts by weight of the copolymer, and then polymerizing the emulsion including the water-soluble initiator at 80 to ° C. for 2 to 10 hours, wherein the copolymer has an average particle diameter of 500 nm or less and satisfies Equation 1 below. In this case, there is an advantage in that ball tack and loop tack can be simultaneously adjusted to predetermined values or more, and thus, pressure-sensitive adhesion and holding power can be greatly improved.

$$0.55 \leq X/Y < 1.07 \quad \text{[Equation 1]}$$

wherein X denotes a loop tack value (N/25 mm), and Y denotes ball tack strength (#).

In another embodiment, the method of preparing the aqueous acrylic pressure-sensitive adhesive composition of the present invention may include mixing a copolymer, an anionic surfactant, and water to prepare an emulsion, wherein the copolymer including 85 to 99% by weight of a linear alkyl acrylate, 0.1 to 3% by weight of an acrylate monomer including a hydroxy group and 0.1 to 3% by weight of an unsaturated carboxylic acid, and wherein the anionic surfactant is present in an amount of 0.3 to 5 parts by weight based on 100 parts by weight of the copolymer; and adding a water-soluble initiator to the emulsion, wherein the water-soluble initiator is present in an amount of 0.01 to 1 part by weight based on 100 parts by weight of the copolymer, and then polymerizing the emulsion including the water-soluble initiator at 80 to 90° C. for 2 to 10 hours, wherein the copolymer has an average particle diameter of 500 nm or less. In this case, there is an advantage in that ball tack and loop tack can be simultaneously adjusted to predetermined values or more, and thus, pressure-sensitive adhesion and holding power can be greatly improved.

In the step of preparing the emulsion, an anionic surfactant, for example, may be dispersed in water, and then mixed with the copolymer.

In the step of preparing the emulsion, for example, a neutralizing agent may be further included. The neutralizing agent may be, for example, sodium hydroxide. In this case, there is an advantage in that pH is maintained in a weakly acidic state during the reaction in the subsequent polymerization step, and thus, particle stability and reactivity can be easily maintained.

In the polymerization step, the water-soluble initiator may be, for example, persulfate. In this case, the polymerization step can be easily performed, and thus, the purposes of the present invention can be easily accomplished.

The persulfate may be, for example, one or more selected from the group consisting of ammonium persulfate, potassium persulfate and sodium persulfate, preferably ammonium persulfate. In this case, pressure-sensitive adhesion is excellent, strong force is necessary to separate the pressure-sensitive adhesive from an adherend within a short time, and a bubble generation rate is decreased.

The water-soluble initiator may be included in an amount of, for example, 0.01 to 1 part by weight, preferably 0.05 to 0.5 parts by weight, more preferably 0.2 to 0.4 parts by weight, based on 100 parts by weight of the copolymer. Within these ranges, there is an advantage in that pressure-sensitive adhesion is further improved.

In the present disclosure, 100% by weight of the copolymer or 100 parts by weight of the copolymer may mean the total weight of a polymerized copolymer or the total weight of monomers used for polymerization of a copolymer. Here, there is no difference between the two expressions because almost all of added monomers are polymerized.

The polymerization step may be, for example, a step of adding one or more additives selected from the group consisting of a molecular weight modifier, an electrolyte, a thickener and an antifoaming agent to the emulsion and polymerizing the same. In this case, there is an advantage in that pressure-sensitive adhesion is excellent, and the stability and properties of the composition are improved.

The molecular weight modifier acts as a chain transfer agent (CTA) during the polymerization. In particular, the molecular weight modifier is attached to an end of a molecule to move the radical to another place and perform a terminating reaction, and may be, for example, one or more selected from the group consisting of alcohol, ether, thioether, dithiocarbonate, nitroxide, mercaptan, TEMPO, lauryl mercaptan, n-dodecyl mercaptan, t-dodecyl mercaptan, n-octyl mercaptan, glycidyl mercaptan, mercapto acetic acid, 2-mercapto ethanol, thioglycolic acid, thioglycolic acid 2-ethylhexyl and 2,3-dimercapto-1-propanol.

The electrolyte may be, for example, one or more selected from the group consisting of sodium bicarbonate, sodium carbonate, sodium phosphate, sodium sulfate and sodium chloride.

The thickener may be, for example, one or more selected from the group consisting of carboxy methyl cellulose (CMC), acryl sol, polyvinyl alcohol, starch, alginate and dextrin.

The antifoaming agent may be, for example, a silicone-based agent, a surfactant-based agent, a paraffin-based agent, or a mineral oil-type agent, preferably a silicone-based. The antifoaming agent may address an uneven coating surface problem of the pressure-sensitive adhesive due to bubbles generated in the process of adding a thickener, etc.

The polymerization may be, for example, emulsion polymerization. As a particular example, the polymerization may be performed at 80 to 90° C. for 2 to 10 hours. Within these ranges, there is an advantage in that ball tack and loop tack can be simultaneously adjusted to predetermined values or more, and thus, pressure-sensitive adhesion and holding power are excellent.

The polymerization may be terminated, for example, when a polymerization conversion rate is 95% or more, preferably 97 to 99% Within these ranges, there is an advantage in that toxicity is low, and low viscosity can be realized even when the solid content is high.

In the present disclosure, the polymerization conversion rate may be measured as a ratio of monomers converted to a polymer by measuring the weight of the polymer after drying relative to the concentration of added monomers to analyze the concentration of materials polymerized into the polymer.

The method of preparing the aqueous acrylic pressure-sensitive adhesive composition may include, for example, a cooling step, pH adjustment step, or a combination thereof, after the polymerization step.

The pH adjustment step may be, for example, a step of adjusting the pH of the composition to 5 to 9, or 6 to 8. In this case, cohesion and pressure-sensitive adhesion may be improved.

In the present disclosure, pH may be measured using a general pH measuring equipment at room temperature (20 to 25° C.) unless stated otherwise. In particular, pH may be measured using a Mettler Toledo Seven Compact pH meter.

The pH adjustment step may be, for example, a step of neutralizing using an alkaline substance. The alkaline substance may be, for example, one or more selected from the group consisting of a monovalent or divalent metal hydroxide, a chloride, an inorganic substance, ammonia, and an organic amine.

Hereinafter, a pressure-sensitive adhesive sheet of the present invention is described. All the contents of the aqueous acrylic pressure-sensitive adhesive composition of the present disclosure and the method of preparing the same are included in description of the pressure-sensitive adhesive sheet.

The pressure-sensitive adhesive sheet of the present disclosure may include, for example, a substrate; and a pressure-sensitive adhesive layer, which includes the aqueous acrylic pressure-sensitive adhesive composition of the present disclosure, formed on one or both surfaces of the substrate. In this case, there is an advantage in that excellent pressure-sensitive adhesion is provided without damaging a surface of a substrate.

The pressure-sensitive adhesive layer may be formed, for example, by applying the aqueous acrylic pressure-sensitive adhesive composition of the present disclosure to one or both surfaces of a substrate. The application method is not specifically limited, and may be, for example, an application method using a coater. The coater may be, for example, a knife coater, a roll coater, a calender coater, a comma coater, a gravure coater, or a rod coater.

The substrate may be, for example, paper, or a film made of PE, PP, PET, or the like, which is advantageous in that the surface of the substrate is not damaged by a pressure-sensitive adhesive of the present disclosure, no contamination remains, and application workability is excellent.

The pressure-sensitive adhesive sheet may be, for example, a paper label, a film label, or a tape.

The pressure-sensitive adhesive sheet may be used, for example, by being attached to an adherend. Here, the adherend may be, for example, one or more selected from the group consisting of metal, glass, wood, and plastic. The plastic may be, for example, one or more selected from the group consisting of PET, PE, PP, ABS and PVC.

Now, the present disclosure will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLES

Example 1

Preparation of Aqueous Acrylic Pressure-Sensitive Adhesive Composition 170 g of ion-exchanged water was fed into a glass reactor equipped with a thermometer, a stirrer, a dropping funnel, a nitrogen introduction tube and a reflux condenser. While stirring this, the inside of the reactor was replaced with nitrogen, and then the temperature thereof was elevated up to 85° C. under a nitrogen atmosphere. Nitrogen was purged for 60 minutes to remove oxygen therein.

Separately, a monomer mixture made of mixing 679 g of n-butyl acrylate (BA), 14 g of 2-hydroxyethyl acrylate (2-HEA), and 7 g of acrylic acid (AA) was prepared in a 2 L beaker. In addition, a solution formed of 35 g of sodium dodecyl benzene sulfonate (SDBS) at a concentration of 20% by weight, 1.4 g of sodium hydroxide and 150 g of water was added to the monomer mixture, followed by stirring. As a result, a white cloudy emulsion was prepared.

The cloudy emulsion and 140 g of an ammonium persulfate solution at a concentration of 2% by weight were uniformly, continuously fed into the glass reactor for 5 hours, and, after completing the addition of the ammonium persulfate solution and the emulsion, aging was performed by maintaining at 85° C. for 2 hours. After completion of the aging for 2 hours, 28 g of a 5% aqueous sodium hydroxide solution was added thereto and maintained at 85° C. for 1 hour, followed by cooling to room temperature. Next, the resultant production was mixed with 10 g of a 70% aqueous DOSS solution, as a wetting agent, thereby preparing an aqueous acrylic pressure-sensitive adhesive composition. Here, % means % by weight, unless defined otherwise.

The prepared aqueous acrylic pressure-sensitive adhesive composition was applied to a silicone-coated release paper, and dried in a 110° C. over for 2 minutes, thereby manufacturing a coating layer having a thickness of 20 μm. The coating layer applied to the silicone-coated release paper was laminated to a transparent BOPP film having a thickness of 50 μm, thereby manufacturing a pressure-sensitive adhesive sheet. Next, the pressure-sensitive adhesive sheet was cut into a size of 25 mm×200 mm and prepare to measure pressure-sensitive adhesive properties.

Examples 2 to 3

Experiments were carried out in the same manner as in Example 1, except that components and contents summarized in Table 1 below were used.

Example 4

Preparation of Aqueous Acrylic Pressure-Sensitive Adhesive Composition 170 g of ion-exchanged water was fed into a glass reactor equipped with a thermometer, a stirrer, a dropping funnel, a nitrogen introduction tube and a reflux condenser, and 1.35 g of an aqueous sodium polyoxyethylene alkyl ether sulfate solution at a concentration of 26% by weight was added thereto. While stirring this, the inside of the reactor was replaced with nitrogen, and then the temperature thereof was elevated up to 85° C. under a nitrogen atmosphere. Nitrogen was purged for 60 minutes to remove oxygen therein.

Separately, a monomer mixture made of mixing 280 g of n-butyl acrylate (BA), 329 g of 2-ethylhexylacrylate (2-EHA), 70 g of methyl methacrylate (MMA), 14 g of 2-hydroxyethyl acrylate (2-HEA), and 7 g of acrylic acid (AA) was prepared in a 2 L beaker. In addition, a solution formed of 2.8 g of an aqueous sodium alkyl diphenyl oxide disulfonate solution at a concentration of 50% by weight, 21.5 g of an aqueous sodium polyoxyethylene alkyl ether sulfate (POES) solution at a concentration of 26% by weight, 1.5 g of sodium hydroxide and 150 g of water was added to the monomer mixture, followed by stirring. As a result, a white cloudy emulsion was prepared.

The white cloudy emulsion and 140 g of an ammonium persulfate solution at a concentration of 2% by weight were uniformly, continuously fed into the glass reactor for 6 hours, and, after completing the addition of the ammonium persulfate solution (APS) and the emulsion, aging was performed by maintaining at 85° C. for 2 hours. After completion of the aging for 2 hours, 28 g of a 5% aqueous sodium hydroxide solution was added thereto and maintained at 85° C. for 1 hour, followed by cooling to room temperature. Next, the resultant production was mixed with 10 g of a 70% aqueous DOSS solution, as a wetting agent, thereby preparing an aqueous acrylic pressure-sensitive adhesive composition.

The prepared aqueous acrylic pressure-sensitive adhesive composition was applied to a silicone-coated release paper, and dried in a 110° C. over for 2 minutes, thereby manufacturing a coating layer having a thickness of 20 μm. The coating layer applied to the silicone-coated release paper was laminated to a transparent BOPP film having a thickness of 50 μm, thereby manufacturing a pressure-sensitive adhesive sheet. Next, the pressure-sensitive adhesive sheet was cut into a size of 25 mm×200 mm and prepare to measure pressure-sensitive adhesive properties.

Examples 5 to 8

Experiments were carried out in the same manner as in Example 1, except that components and contents summarized in Table 1 below were used.

Example 9

An experiment was carried out in the same manner as in Example 4, except that components and contents summarized in Table 1 below were used.

Comparative Examples 1 to 10

Comparative Examples 1, 3, 4 and 8 to 10 were carried out in the same manner as in Example 1, except that components and contents shown in Table 1 below were used, and Comparative Examples 2 and 5 to 7 were carried out in the same manner as in Example 4, except that components and contents shown in Table 1 below were used.

TABLE 1

| Classification | Monomer | | | | | Initiator | Surfactant | |
| --- | --- | --- | --- | --- | --- | --- | --- | --- |
| | AA | HEA | BA | 2-EHA | MMA | APS (phr) | SDBS | POES |
| Example 1 | 1 | 2 | 97 | — | — | 0.4 | 1.0 | — |
| Example 2 | 2 | 2 | 96 | — | — | 0.4 | 1.0 | — |
| Example 3 | 1.5 | 2 | 96.5 | — | — | 0.4 | 1.0 | — |
| Example 4 | 1 | 2 | 40 | 47 | 10 | 0.4 | — | 0.85 |
| Example 5 | 2 | 1 | 97 | — | — | 0.4 | 1.0 | — |
| Example 6 | 1 | 2 | 92 | — | 5 | 0.4 | 1.0 | — |
| Example 7 | 1 | 2 | 97 | — | — | 0.2 | 1.0 | — |
| Example 8 | 1 | 2 | 97 | — | — | 0.4 | 0.6 | — |
| Example 9 | 1 | 2 | 97 | — | — | 0.4 | — | 0.85 |
| Comparative Example 1 | 1 | 2 | — | 97 | — | 0.4 | 1.0 | — |
| Comparative Example 2 | 1 | 2 | — | 94 | 3 | 0.4 | — | 0.85 |
| Comparative Example 3 | 1 | 2 | — | 77 | 20 | 0.4 | 1.0 | — |
| Comparative Example 4 | 2 | 2 | 96 | — | — | 0.4 | 0.2 | — |
| Comparative Example 5 | 2 | 2 | 96 | — | — | 0.4 | — | — |
| Comparative Example 6 | 4 | — | 96 | — | — | 0.3 | — | 0.85 |
| Comparative Example 7 | 1 | 4 | 95 | — | — | 0.2 | — | 0.85 |
| Comparative Example 8 | 0.2 | 0.3 | 99.5 | — | — | 0.4 | 1.0 | — |
| Comparative Example 9 | 1 | 0.05 | 98.95 | — | — | 0.4 | 1.0 | — |
| Comparative Example 10 | 1 | 4 | 95 | — | — | 0.4 | 1.0 | — |

In Table 1, the content of each monomer means % by weight based on the total weight of all monomers, and the content of each initiator and surfactant means parts by weight based on 100 parts by weight of the copolymer.

Experimental Examples

The properties of specimens manufactured according to Examples 1 to 9 and Comparative Examples 1 to 10 were measured according to the following methods. Results are summarized in Table 2 below.

* Loop tack: Test Initial pressure-sensitive adhesion test method specified in FTM9. After a pressure-sensitive adhesive sheet was brought into contact with a pressure-sensitive adhesive label loop with a wide of 25 mm on a metal surface with a constant force, force required to remove the pressure-sensitive adhesive sheet was measured. Here, initial pressure-sensitive adhesion is high as the measured value is large.

* Ball tack strength (#): Initial pressure-sensitive adhesion was measured according to the inclined ball tack test method (inclined angle: 30 degrees, 23° C., 55% RH) specified in JIS Z 0237.

* Peeling force (180 Peel): The pressure-sensitive adhesive sheet was placed on SUS (SUS 304 product) and attached thereto by reciprocating a 2 kg roller twice at a speed of 300 mm/min, followed by aging for 20 minutes at room temperature. Pressure-sensitive adhesion was measured while peeling 180 degrees at a speed of 300 mm/min using a TA Texture Analyzer.

* Holding power (Shear): The pressure-sensitive adhesive sheet having an area of 25 mm×25 mm was attached to SUS and, after 20 minutes, a load was applied with a weight of 1 kg to measure a falling time.

TABLE 2

| Classification | Diameter (nm) | Loop Tack (N/25 mm) | Ball Tack (#) | 180 Peel (N/25 mm) | Shear (h) | X/Y | X/Ya |
|---|---|---|---|---|---|---|---|
| Example 1 | 251 | 16.1 | 24 | 17.2 | 23 | 0.67 | 57.93 |
| Example 2 | 245 | 13.3 | 23 | 16.6 | 85 | 0.58 | 54.37 |
| Example 3 | 240 | 17.1 | 26 | 18.7 | 65 | 0.66 | 48.39 |
| Example 4 | 255 | 18.4 | 21 | 19.8 | 22 | 0.88 | 98.83 |
| Example 5 | 260 | 16.7 | 20 | 16.9 | 51 | 0.84 | 103.84 |
| Example 6 | 245 | 19.1 | 24 | 20.5 | 54 | 0.80 | 68.73 |
| Example 7 | 267 | 14.5 | 24 | 16.4 | 45 | 0.60 | 52.17 |
| Example 8 | 297 | 13.3 | 24 | 13.6 | 14 | 0.55 | 47.86 |
| Example 9 | 246 | 16.3 | 25 | 18.4 | 31 | 0.65 | 51.89 |
| Comparative Example 1 | 249 | 10.4 | 26 | 12.4 | 11 | 0.4 | 29.43 |
| Comparative Example 2 | 253 | 11.1 | 23 | 13.8 | 17 | 0.48 | 45.38 |
| Comparative Example 3 | 234 | 19.4 | 15 | 21.4 | 34 | 1.29 | 285.92 |
| Comparative Example 4 | 368 | 11.8 | 22 | 10.7 | 37 | 0.54 | 55.12 |
| Comparative Example 5 | 394 | 10.8 | 28 | 10.6 | 12 | 0.39 | 24.47 |
| Comparative Example 6 | 277 | 12.6 | 19 | 12.8 | 102 | 0.66 | 91.38 |
| Comparative Example 7 | 281 | 11.4 | 21 | 13.3 | 86 | 0.54 | 61.23 |
| Comparative Example 8 | 297 | 15.8 | 26 | 19.8 | 6 | 0.61 | 44.72 |
| Comparative Example 9 | 256 | 10.1 | 21 | 13.4 | 25 | 0.48 | 54.25 |
| Comparative Example 10 | 241 | 10.6 | 22 | 14.7 | 31 | 0.48 | 49.52 |

As shown in Table 2, it was confirmed that, in the case of the aqueous acrylic pressure-sensitive adhesive compositions (Examples 1 to 9) of the present invention, ball tack and loop tack were simultaneously improved, and thus, initial pressure-sensitive adhesion, pressure-sensitive adhesion, and holding power were excellent.

On the other hand, it was confirmed that in the case of Comparative Examples 1 to 5 not satisfying Equation 1, initial pressure-sensitive adhesion, pressure-sensitive adhesion and holding power were decreased.

In addition, it was confirmed that, in the case of Comparative Example 6 excluding the acrylate monomer including a hydroxy group of the present invention, and Comparative Example 7 including the monomer in an amount exceeding the range of the present invention, pressure-sensitive adhesion was decreased.

Further, it was confirmed that, in the case of Comparative Example 8 including less than 85% by weight of a linear alkyl acrylate, and Comparative Examples 9 and 10 respectively including the acrylate monomer including a hydroxy group in amounts of less than 0.1% by weight and greater than 3% by weight, pressure-sensitive adhesion and holding power, etc. was poor.

The invention claimed is:

1. An aqueous acrylic pressure-sensitive adhesive composition, comprising:

a copolymer comprising 85 to 99% by weight of a linear alkyl acrylate, 0 to 10% by weight of an alkyl methacrylate, 0.5 to 2% by weight of an acrylate monomer comprising a hydroxy group, and 0.1 to 3% by weight of an unsaturated carboxylic acid, wherein the sum of the content of the acrylate monomer comprising a hydroxy group and the content of the unsaturated carboxylic acid is 2 to 4% by weight; and an anionic surfactant, wherein the anionic surfactant is present in an amount of 0.01 to 5 parts by weight based on 100 parts by weight of the copolymer, wherein the copolymer has an average particle diameter of 500 nm or less and satisfies Equation 1:

$$0.55 \leq X/Y < 1.07 \quad \text{[Equation 1]}$$

wherein X denotes a loop tack value (N/25 mm), and Y denotes a ball tack strength (#), wherein the acrylate monomer comprising a hydroxy group is one or more selected from the group consisting of 2-hydroxyethyl (meth) acrylate, 2-hydroxypropyl (meth) acrylate, 4-hydroxybutyl (meth) acrylate, 6-hydroxyhexyl (meth) acrylate, 8-hydroxyoctyl (meth) acrylate, 2-hydroxyethylene glycol (meth) acrylate and 2-hydroxypropylene glycol (meth) acrylate, wherein the unsaturated carboxylic acid is one or more selected from the group consisting of acrylic acid, methacrylic acid, crotonic acid, itaconic acid, maleic acid, fumaric acid, citraconic acid and mesaconic acid, wherein the anionic surfactant is one or more selected from the group consisting of sodium dodecyl benzene sulfonate and sodium polyoxyethylene alkyl ether sulfate, and wherein the aqueous acrylic pressure-sensitive adhesive composition has a loop tack of 13 to 25 N/25 mm, and a ball tack strength (#) of 20 to 32.

2. The aqueous acrylic pressure-sensitive adhesive composition according to claim 1 and wherein the anionic surfactant is present in an amount of 0.3 to 5 parts by weight based on 100 parts by weight of the copolymer.

3. The aqueous acrylic pressure-sensitive adhesive composition according to claim 1, wherein the linear alkyl acrylate is one or more selected from the group consisting of methyl acrylate, ethyl acrylate, n-propyl acrylate, n-butyl acrylate, pentyl acrylate, n-octyl acrylate, lauryl acrylate and tetradecyl acrylate, and the alkyl methacrylate is one or more selected from the group consisting of methyl methacrylate, ethyl methacrylate, n-propyl methacrylate, isopropyl methacrylate, n-butyl methacrylate, t-butyl methacrylate, sec-butyl methacrylate, pentyl methacrylate, 2-ethylhexyl methacrylate, 2-ethylbutyl methacrylate, n-octyl methacrylate, isooctyl methacrylate, isononyl methacrylate, lauryl methacrylate and tetradecyl methacrylate.

4. A method of preparing the aqueous acrylic pressure-sensitive adhesive composition according to claim 1, the method comprising:

mixing the copolymer and the anionic surfactant and water to prepare an emulsion;

adding a water-soluble initiator to the emulsion, wherein the water-soluble initiator is added in an amount of 0.01 to 1 part by weight based on 100 parts by weight of the copolymer; and then polymerizing the emulsion including the initiator at 80 to 90° C. for 2 to 10 hours.

5. The method according to claim 4, wherein the water-soluble initiator is persulfate.

6. A pressure-sensitive adhesive sheet, comprising:
a substrate; and
a pressure-sensitive adhesive layer formed on one or both surfaces of the substrate,
wherein the pressure-sensitive adhesive layer comprises the aqueous acrylic pressure-sensitive adhesive composition according to claim 1.

7. An aqueous acrylic pressure-sensitive adhesive composition, comprising:

a copolymer comprising 85 to 99% by weight of a linear alkyl acrylate, 0 to 10% by weight of an alkyl methacrylate, 0.5 to 2% by weight of an acrylate monomer comprising a hydroxy group, and 0.1 to 3% by weight of an unsaturated carboxylic acid, wherein the sum of the content of the acrylate monomer including a hydroxy group and the content of the unsaturated carboxylic acid is 2 to 4% by weight; and an anionic surfactant, wherein the anionic surfactant is present in an amount of 0.01 to 5 parts by weight based on 100 parts by weight of the copolymer, and wherein the copolymer has an average particle diameter of 500 nm or less and satisfies Equation 1a:

$$47 < X/Ya < 200 \qquad [\text{Equation 1a}]$$

wherein X denotes a loop tack value (N/25 mm), and Ya denotes a value obtained by converting ball tack strength (#) into a unit of force (N) and is calculated by Equation 3, wherein the acrylate monomer comprising a hydroxy group is one or more selected from the group consisting of 2-hydroxyethyl (meth) acrylate, 2-hydroxypropyl (meth) acrylate, 4-hydroxybutyl (meth) acrylate, 6-hydroxyhexyl (meth) acrylate, 8-hydroxyoctyl (meth) acrylate, 2-hydroxyethylene glycol (meth) acrylate and 2-hydroxypropylene glycol (meth) acrylate, wherein the unsaturated carboxylic acid is one or more selected from the group consisting of acrylic acid, methacrylic acid, crotonic acid, itaconic acid, maleic acid, fumaric acid, citraconic acid and mesaconic acid, and wherein the anionic surfactant is one or more selected from the group consisting of sodium dodecyl benzene sulfonate and sodium polyoxyethylene alkyl ether sulfate, $$Ya = A \times 0.0098 \qquad [\text{Equation 3}]$$

wherein A denotes a weight of a steel ball, and wherein, the weights of steel balls No. 1 to No 32 are sequentially 0.0021 g, 0.0164 g, 0.0554 g, 0.1313 g, 0.2564 g, 0.4431 g, 0.7036 g, 1.0503 g, 1.4955 g, 2.0514 g, 2.7304 g, 3.5449 g, 4.507 g, 5.6291 g, 6.9236 g, 8.4026 g, 10.0787 g, 11.9639 g, 14.0707 g, 16.4114 g, 18.9982 g, 21.8436 g, 24.9597 g, 28.3589 g, 32.0535 g, 36.0558 g, 40.3782 g, 45.0329 g, 50.0322 g, 55.3885 g, 61.114 g, and 67.2211 g.

8. An aqueous acrylic pressure-sensitive adhesive composition, comprising:

a copolymer comprising 96 to 97% by weight of a linear alkyl acrylate, 1 to 2% by weight of an acrylate monomer comprising a hydroxy group, and 1 to 2% by weight of an unsaturated carboxylic acid; and an anionic surfactant, wherein the anionic surfactant is present in amount of 0.01 to 5 parts by weight based on 100 parts by weight of the copolymer, wherein the copolymer has an average particle diameter of 500 nm or less and satisfies Equation 1 below:

$$0.55 \leq X/Y < 1.07 \qquad [\text{Equation 1}]$$

wherein X denotes a loop tack value (N/25 mm), and Y denotes a ball tack strength (#), wherein the acrylate monomer comprising a hydroxy group is one or more selected from the group consisting of 2-hydroxyethyl (meth) acrylate, 2-hydroxypropyl (meth) acrylate, 4-hydroxybutyl (meth) acrylate, 6-hydroxyhexyl (meth) acrylate, 8-hydroxyoctyl (meth) acrylate, 2-hydroxyethylene glycol (meth) acrylate and 2-hydroxypropylene glycol (meth) acrylate, wherein the unsaturated carboxylic acid is one or more selected from the group consisting of acrylic acid, methacrylic acid, crotonic acid, itaconic acid, maleic acid, fumaric acid, citraconic acid and mesaconic acid, wherein the anionic surfactant is one or more selected from the group consisting of sodium dodecyl benzene sulfonate and sodium polyoxyethylene alkyl ether sulfate, and wherein the aqueous acrylic pressure-sensitive adhesive composition has a loop tack of 13 to 25 N/25 mm, and a ball tack strength (#) of 20 to 32.

* * * * *